United States Patent [19]

Ishikawa et al.

[11] 4,182,633

[45] Jan. 8, 1980

[54] PROCESS OF THE OPERATION OF A SIMULATED MOVING BED

[75] Inventors: Hachiro Ishikawa, Chofu; Hidekatu Tanabe, Hatano; Keizo Usui, Yokohama, all of Japan

[73] Assignee: Mitsubishi Chemical Industries Limited, Tokyo, Japan

[21] Appl. No.: 862,163

[22] Filed: Dec. 19, 1977

[30] Foreign Application Priority Data

Dec. 21, 1976 [JP] Japan .................................. 51-153668
Jan. 13, 1977 [JP] Japan .................................... 52-2576

[51] Int. Cl.$^2$ ........................ C13K 1/00; C13K 3/00; C13K 11/00; C13D 3/14
[52] U.S. Cl. ................................ 127/46 A; 23/230 A; 55/386; 127/9; 210/96.1; 210/198 C
[58] Field of Search ...................... 127/46 A, 46 B, 9; 23/230 A; 210/96 R

[56] References Cited

U.S. PATENT DOCUMENTS

| | | | |
|---|---|---|---|
| 2,985,589 | 5/1961 | Broughton | 210/34 |
| 3,416,961 | 12/1968 | Mountfort | 127/46 A X |
| 3,581,894 | 6/1971 | Minart | 210/96 |
| 3,692,582 | 9/1972 | Melaja | 127/9 X |
| 3,694,158 | 9/1972 | Lauer | 23/230 A X |
| 3,785,864 | 1/1974 | Lauer | 23/230 A X |
| 4,022,637 | 5/1977 | Sutthoff | 127/46 A |
| 4,075,293 | 2/1978 | Grill | 23/230 A X |
| 4,088,740 | 5/1978 | Gaines | 23/230 A X |

*Primary Examiner*—Sidney Marantz
*Attorney, Agent, or Firm*—Oblon, Fisher, Spivak, McClelland & Maier

[57] ABSTRACT

A process of the operation of simulated moving bed is disclosed in which said bed is packed with a solid sorbent and provided with a plurality of pipes acting as a feed stock inlet, a desorbent inlet, a sorbed component outlet and a non-sorbed component outlet and the upstream end and the downstream end of the bed are interconnected to form a loop path, and a fluid containing the sorbed component and the non-sorbed component, and a desorbent are supplied to the bed and the sorbed component and the non-sorbed component separated are recovered. An improvement comprises the flow rate of the fluid is controlled on the basis of the concentration distribution of the sorbed and the non-sorbed components whereby the separated components are recovered in high purity and in constant composition.

10 Claims, 7 Drawing Figures

PROCESS OF THE OPERATION OF A SIMULATED MOVING BED

This invention relates to an improvement in the operation of a simulated moving bed and particularly to a process of the operation of a simulated moving bed comprising measuring the concentration of at least one component in a fluid, which is passed through the bed, at at least one position in the path of fluid and controlling the flow rate of the fluid passing through the bed on the basis of the measurement.

A so-called "simulated moving bed" apparatus for separating the components present in a fluid was known as disclosed, for example, in U.S.P. 2,985,589 issued on May 23, 1961, Donald B. Broughton et al. The apparatus comprises a bed packed with a solid sorbent, a fluid conduit interconnecting the upstream end and the downstream end of the bed to form a loop through which a fluid is passed in one direction, and a plurality of pipes which perform as an inlet for a desorbent, an outlet for a sorbed component, an inlet for a feed stock and an outlet for a non-sorbed component in turn at the selected positions in the bed in the fluid flow direction; and the apparatus is operated by shifting the positions of said inlets and outlets to those provided downstream at a predetermined time interval. In this apparatus, the solid sorbent does not actually move within the apparatus and, by downstream shifting of the positions of the inlets and the outlets at a predetermined interval, a component has higher degree of sorbency on the sorbent (hereunder refer to as "sorbed component") and another component which has lower degree of sorbency on the sorbent (hereunder refer to as "non-sorbed component") can be separated continuously.

In the specification and the claims, the term "sorption" includes adsorption, absorption, inclusion, occlusion and chemical reaction so far as a certain component in a fluid is selectively retained on and/or in a sorbent.

In a separation process in the simulated moving bed, there is observed gradual variation of the concentrations of the sorbed component and the non-sorbed component in the fluid flowing along the longitudinal direction of the bed. In other words, the fluid passing through the bed creates a certain pattern of concentration distribution profile of the sorbed component and the non-sorbed component as the fluid flows through the bed. Such concentration distribution moves downstream as the positions of the inlets and the outlets are shifted downstream, but such pattern is continuously maintained if the process is operated under ideal conditions. Accordingly, at a point of the bed, the concentrations of the sorbed component and the non-sorbed component in the fluid change periodically according to a certain wave pattern, and their cycle period and wave pattern are identical with respect to each point throughout the bed.

In the operation of a simulated moving bed, the reason for periodical downstream shifting of the feed stock inlet and the desorbent inlet is, by monitoring the downstream movement of such concentration distribution, to introduce the feed stock and the desorbent to the bed at positions at which the concentrations of the components have predetermined values whereby the wave patterns of the concentration distributions are maintained at constant. On the other hand, the reason for shifting the sorbed component outlet and the non-sorbed component outlet is to withdraw them from the positions at which the components in the fluid have predetermined concentrations whereby the fluids having a constant purity and a constant concentration can be recovered. Therefore, it is essential to determine the positions, at which the feed stock and the desorbent are introduced and the sorbed component and the non-sorbed component are withdrawn, depending upon the wave patterns of the concentration distribution in the bed.

Heretofore, the operation of simulated moving bed is made by downstream shifting of the inlets and the outlets at a predetermined time interval and this process has proved satisfactory when desired wave patterns of the concentration distributions are established in the bed; however, if, for some reason, the concentration distribution of even one component deviates from the desired wave pattern, the operation becomes unsatisfactory.

From the foregoing, it is clear that precise monitoring of the concentration distributions is essential for normal operation of the simulated moving bed in order to obtain desired results, and the distributions can be determined by sampling the fluid from the bed at as many positions as possible and at as short an interval as possible and analyzing it with respect to each component. However, this method is impractical since such continuous monitoring is labor and time consuming We have conducted intensive study to find a simple way of detecting the concentration distributions in the simulated moving bed and found that, if the composition of the fluid passing through any point of the bed is analyzed, it is possible to predict correctly when the fluid which has a composition similar to that previously analyzed will appear at other points in the bed. This means that, if the composition of the fluid is continuously analyzed for one cycle during which the inlets and the outlets are shifted downstream then restored to the original positions, the composition at any point in the bed can readily be predicted.

This invention is accomplished on the basis of the above knowledge and a simulated moving bed is operated by monitoring and recording continuously the composition of the fluid at any point in the bed, predicting the concentration distributions on the basis of the analytical results recorded and the period of one cycle to determine as to whether the composition deviates from the predetermined wave patterns and adjusting the flow rate of the feed stock, the desorbent, the sorbed component and the desorbed component to maintain the predetermined wave patterns.

This invention will be explained in further detail.

The measurement or analysis of fluid composition is made at any point along a path through which the fluid is circulated, and an analyzer is conveniently positioned at any point on the path interconnecting the upstream end and the downstream end of the bed; alternatively a portion of the fluid is sampled at any point of the bed and subjected to analysis. The analysis is conveniently effected continuously; however, it may be done intermittently at as short an interval as possible, for example, the order of one-tenth of one cycle or shorter. The analysis may be directed to all or a part of the components in the fluid; however, usually, the concentration of both or either the sorbed component and the non-sorbed component is measured, or the total concentration and the proportion of both components are measured.

On the basis of various parameters including the measurements of concentration thus obtained, the period of cycle in the bed and the period for which the concentration distribution measured at a given point moves to a predetermined point in the bed in terms of one cycle, the concentration distributions in the bed can be predicted.

By "the period in terms of one cycle," we mean a phase difference in the cycle of concentration variation between the point at which the measurement is made and a given point of the bed, such phase difference being proportional to the distance from the upstream end; if the bed has the same sectional area throughout, there is the phase difference of a one cycle between the upstream end and downstream end.

Figure 1:
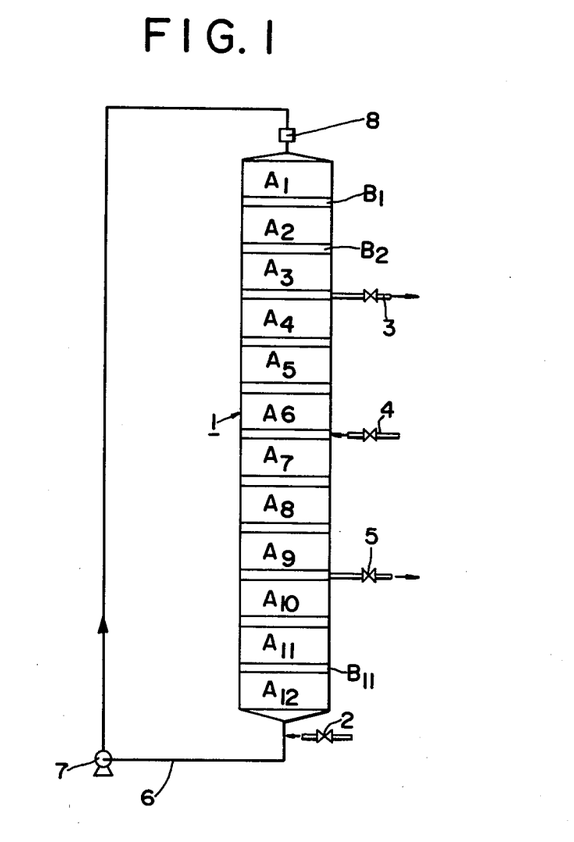
FIG. 1 schematically illustrates a simulated moving bed suitable for this invention.

Referring to FIG. 1 which schematically illustrates a simulated moving bed, column 1 comprises, for example, twelve zones $A_1, A_2 \ldots A_{12}$ in a series and packed with a solid sorbent and eleven interconnecting zones $B_1, B_2 \ldots B_{11}$ provided between adjacent sorbent zones, the upstream end and the downstream end are interconnected with pipe line 6 provided with a pump to recirculate the fluid in the column 1 and at an appropriate position of the line 6 an analyzer 8 is positioned. Connected with each of the zones $B_1, B_2 \ldots B_{11}$ are pipe lines through which the feed stock and the desorbent are introduced and the sorbed component and the non-sorbed component are withdrawn at selected positions. For illustration purpose, FIG. 1 shows only the feed stock inlet 4, the desorbent inlet 2, the sorbed component outlet 3 and the non-sorbed component outlet 5 and these lines are shifted downstream at a predetermined time interval.

Figure 2:
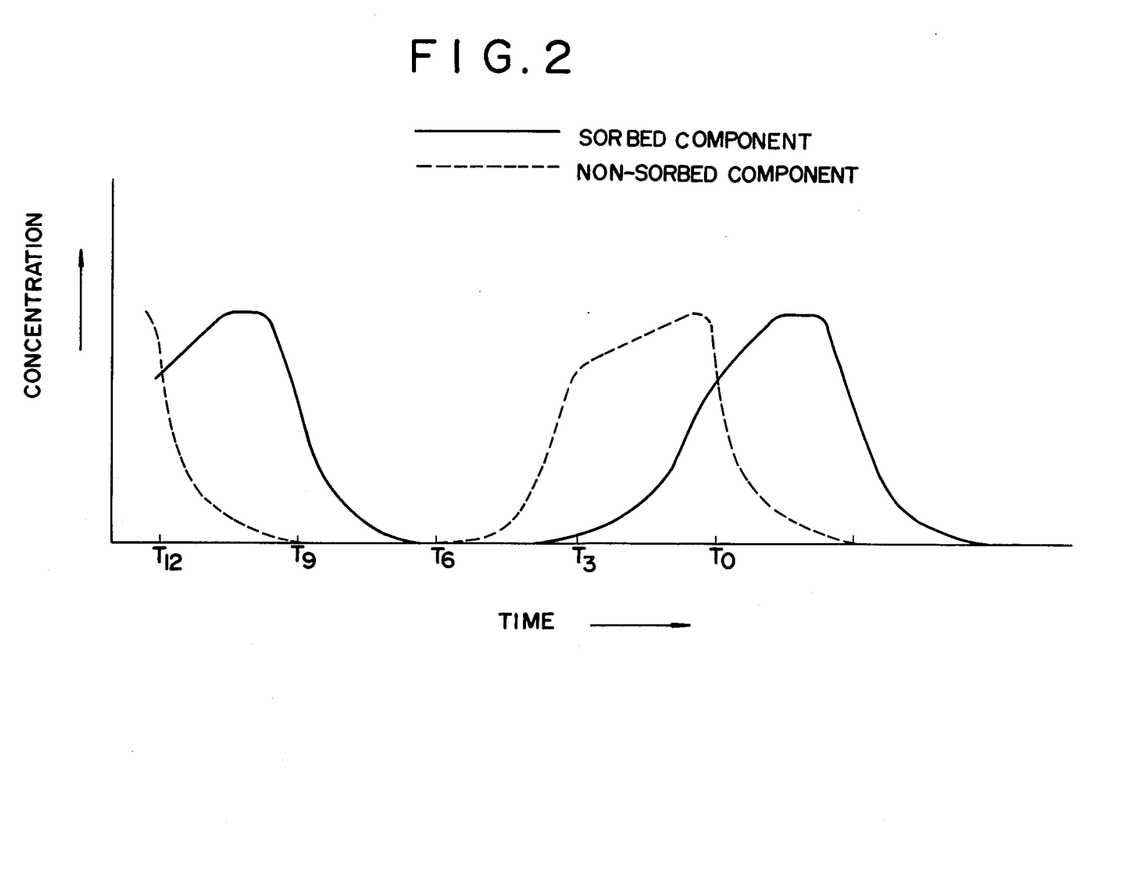
FIG. 2 is a graph showing concentration distribution curves of the sorbed component and the non-sorbed component obtained by operating the bed of FIG. 1.

Now, at the entrance of the zone $A_1$, the concentrations of the sorbed component and the non-sorbed component are continuously measured as the time lapses and the relationship of the concentrations and the time is plotted to obtain two curves as shown in FIG. 2 in which the ordinate and the abscissa represent the concentration and the time, respectively, and the solid line and the dotted line represents the concentrations of the sorbed component and the non-sorbed component, respectively. From one curve, the concentration of, for example, the sorbed component in the fluid in the bed at a given time "To" can be predicted by dividing the time length "T" for the past one cycle from a given point "To" into twelve equal parts and presuming the reading of the concentration on the ordinate of each divided point to be the concentration at downstream end of the corresponding divided zone. A concentration "Cn" measured at a time "Tn" corresponds to the concentration upstream end of the divided zone "An+1" at the time "To."

According to this invention, the operation of a simulated moving bed is controlled on the basis of such predicted concentration distribution.

First of all, it is decided as to whether the wave patterns of the concentration distributions actually measured as above conform to the desired wave pattern.

By "the desired wave pattern of concentration distribution," we mean a wave pattern satisfying the following conditions:

(1) at at least one position on the path along which the fluid is flowing, the concentration distribution of either the sorbed component or the non-sorbed component or both of them are measured directly or indirectly over at least one cycle period, (2) the concentrations of the sorbed component and the non-sorbed component measured are designated as "$C_S$" and "$C_N$", respectively, the maximum concentrations of the sorbed component and the non-sorbed component during one cycle are designated as $(C_S)$max and $(C_N)$max, respectively, and the duration for one cycle is designated as "T", and (3) a concentration range within which a value of $C_S/(C_S)$max is less than 0.1 or a value of $C_N/(C_N)$max is less than 0.1 is continuously detected for a period of from 0.25T to 0.6T.

In order to separate and recover the sorbed component and the non-sorbed component each in high purity, it is desirable to measure the predicted concentration distributions of such two components and to control the flow rate of fluid in the bed so as to satisfy the "$C_S/(C_S)$max" and "$C_N/(C_N)$max" values of the components the conditions mentioned above.

It is desirable that concentration distributions of the sorbed component and the non-sorbed component be detected for an appropriate period of time.

By "the desired wave pattern", we mean that:

(1) the predicted concentration distributions of the sorbed component and the non-sorbed component are measured over at least one cycle, (2) a value of "$C_N/C_S$" is designated as "R", and (3) during the non-sorbed component concentration changes from downward to upward, a range within which the concentration distribution is of $R \leq 0.1$ is detected continuously for a period of from 0.1T to 0.6T in one cycle and also during the sorbed component concentration changes from downward to upward, a range within which the concentration distribution is of $R \geq 10$ is continuously detected for a period of from 0.1T to 0.6T in one cycle.

Such wave patterns of concentration distribution are important for the purpose of separation and for recovery of the sorbed component and the non-sorbed component in high purity.

Figure 3:
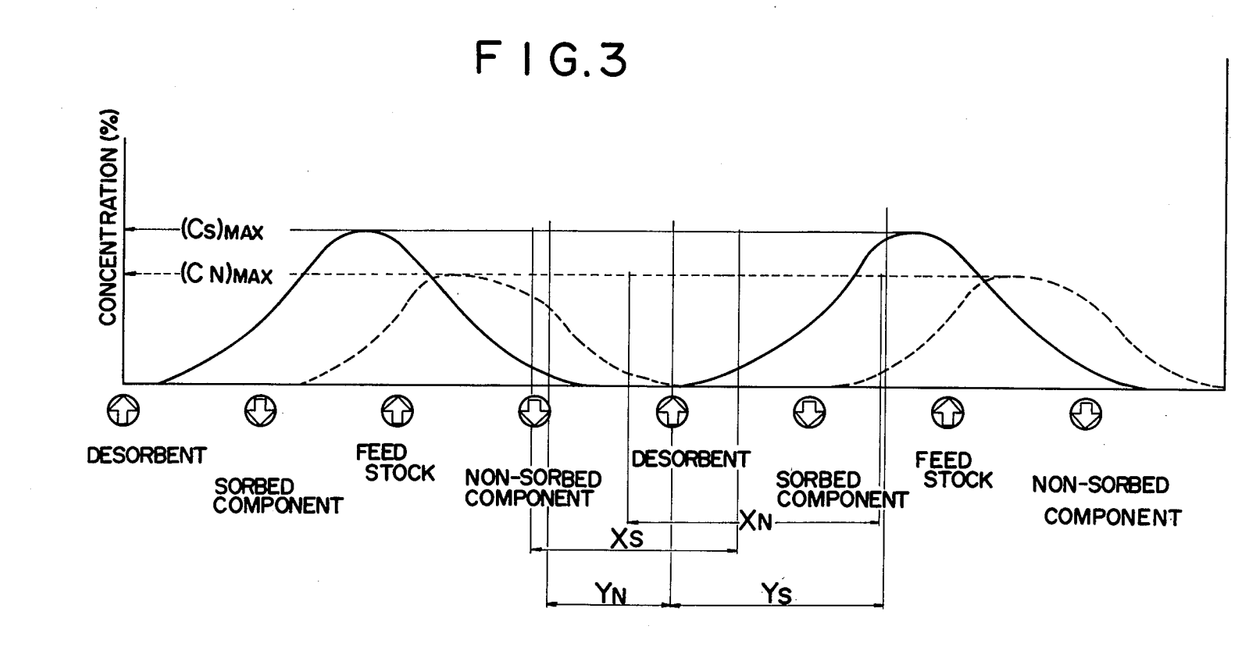
FIG. 3 illustrates desired wave patterns of the concentration distributions, FIG. 4 and FIG. 5 each illustrates one embodiment of the wave patterns of the concentration distributions

FIG. 3 illustrates wave patterns of the concentration distributions which are preferred embodiment according to this invention in which the solid line represents the concentration distribution of the sorbed component, the dotted line represents the concentration distribution of the non-sorbed component, "$(C_S)$max" and "$(C_N)$max" represent the maximum values of the sorbed component and the non-sorbed component obtained in a given cycle, respectively, and each of the ranges "$X_S$" and "$X_N$" represents the concentration ranges in which the values of "$(C_S)$max" and "$(C_N)$max" are less than 0.1T and each of the ranges "$Y_S$" and "$Y_N$" represents the ranges in which the concentrations of the sorbed component and the non-sorbed component are $R \leq 0.1$ and $R \geq 10$, respectively.

Figure 4:
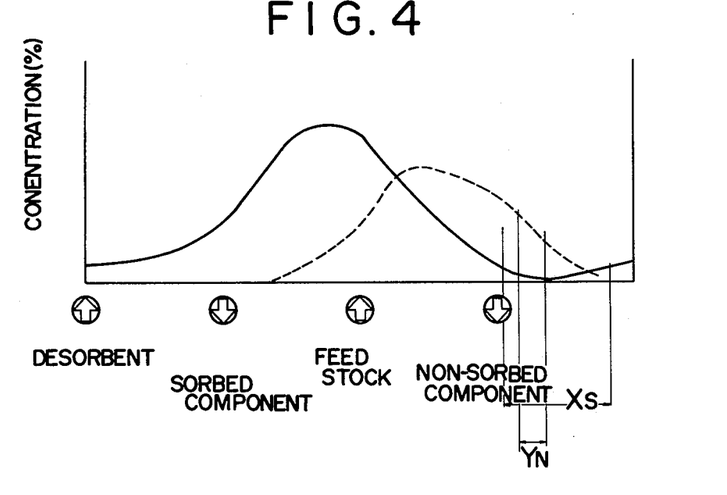
Figure 5:
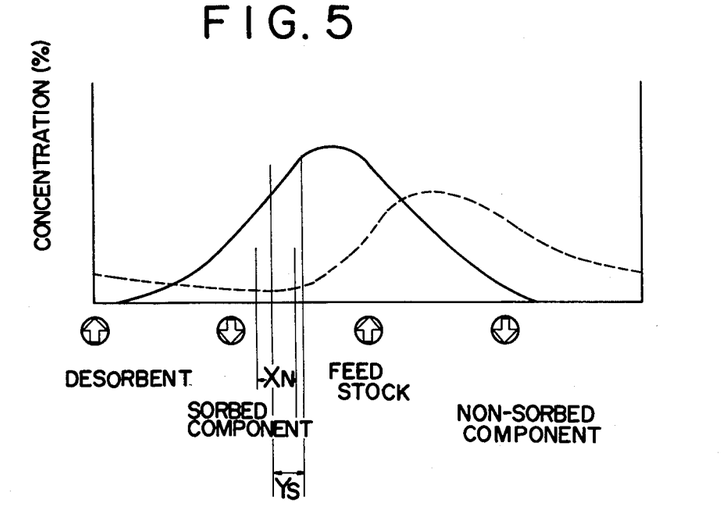

FIGS. 4 and 5 illustrate wave patterns of the concentration distribution which are unsatisfactory in this invention. The curves show that the range of "$X_N$" or "$X_S$" in which "$C_N/(C_N)max$" or "$C_S/(C_S)max$" is less than 0.1 is shorter than 0.25T and the ranges "$Y_S$" and "$Y_N$" in which the concentrations of the non-sorbed component and the sorbed component are $R \leq 0.1$ and $R \geq 10$, respectively, are shorter than 0.1T.

Accordingly, if wave patterns as shown in FIG. 4 or FIG. 5 are observed, it is necessary to change operation conditions to correct the wave patterns to the desired ones.

In order to change the wave pattern in a particular zone of the bed without influencing other zones, a flow rate of fluid introduced at upstream of the particular zone and a flow rate withdrawn at downstream of said zone are increased or decreased in the same increments.

If the concentration distribution lags, that is, if the downstream movement of the concentration distribution measured lags from the desired one, the flow rate in such zone is increased to accelerate the downstream movement of the measured concentration distribution.

Referring to FIG. 4 in which the concentration distribution of the sorbed component lags from the desired one, that is, there is a lag in the downstream movement of a zone in which the concentration of the sorbed component lowers, then the amount of the desorbent supply and the sorbed component withdrawal are increased to accelerate the downstream movement of the concentration distribution.

On the other hand, if the concentration distribution accelerates, the flow rate is decreased to delay the downstream movement of the concentration distribution.

For example, as shown in FIG. 5, if there is an advance of the downstream movement of the non-sorbed component in a zone in which the concentration of the non-sorbed component increases, the amounts of the non-sorbed component withdrawal and the desorbent supply are increased.

In order to achieve the upstream movement of the concentration distribution in the zone between the non-sorbed component outlet and the desorbent inlet, the amounts of the non-sorbed component withdrawl and the desorbent supply are increased.

If the downstream movement of the concentration distribution between the sorbed component outlet and the feed stock inlet is intended, the amounts of the sorbed component withdrawal and the feed stock supply are decreased.

The upstream movement of the concentration distribution between the feed stock inlet and the non-sorbed component outlet is effected by decreasing the amounts of the feed stock supply and the non-sorbed component withdrawal.

In general, when the flow rate is increased, the upward line of the curve rises and the downward line tends to descend slowly to give an undesirable tail portion in sometimes.

If the concentration distribution is measured with respect to one certain component, the determination as to whether the process is operating under normal conditions is decided by investigating the predicted concentration distribution of the certain component and the position of outlet from which another component is withdrawn. For example, when the predicted concentration distribution of the non-sorbed component is measured and it is presumed that, from the position of the sorbed component outlet and the concentration distribution of the non-sorbed component, much more than non-sorbed component is withdrawn from the sorbed component outlet, then it is judged that the downstream movement of the non-sorbed component is delayed and, therefore, the flow rate of the fluid downstream of the outlet of the sorbed component is to be increased.

The change of the flow rate of the fluid in the bed for controlling the concentration distribution may be made by changing the discharge fluid volume of pump 7. By this method, the flow rate is changed throughout the bed and thus the overall concentration distribution will be changed.

According to this invention, in order to conform the predicted wave patterns concentration distribution obtained as above to the desired wave patterns of concentration distribution, the flow rate of the fluid passing through the bed is controlled and, on the basis of the predicted wave patterns, the positions of the feed stock inlet, the non-sorbed component outlet, the desorbent inlet and the sorbed component outlet and the time interval of downstream shifting of the inlets and outlets are determined.

The sorbed component is withdrawn from the bed at a range within which the concentration is $R \leq 2$ and the concentration of the non-sorbed component changes from downward to upward.

The non-sorbed component is withdrawn at a range within which the concentration is $R \geq 5$ and the concentration of the non-sorbed component is increasing but the concentration of the sorbed component changes its tendency from decreasing to increasing.

The feed stock is supplied at a position which is upstream of the non-sorbed component outlet and downstream of the sorbed component outlet. It is desirable that the proportion of the amount of sorbed component and the amount of non-sorbed component predicted in the fluid flowing at the inlet zone be similar to that of the feed stock.

The desorbent is introduced at a position which is upstream of the sorbed component outlet and downstream of the non-sorbed component outlet and at which the sum of the concentrations of both components is minimum, especially less than a value of $0.2[C_S/(C_S)max + C_N/(C_N)max]$.

Referring to FIGS. 1 and 2, the positions of the feed stock supply, the non-sorbed component withdrawal, the desorbent supply and the sorbed component withdrawal are at 2, 3, 4 and 5, respectively, at a given time To.

This operation can be controlled by the instructions from an electronic computer; in such case, a specific region in which the composition of the fluid has the desired concentration distribution of the sorbed component is selected on the basis of the concentration which is measured continuously, and then the time required for reaching the specified region to the predetermined outlet is calculated and the selected outlet is in turn opened.

It is desirable to measure the concentrations of both components in the fluid passing through the measuring site and to choose the most appropriate positions to which the feed stock inlet and the desorbent inlet, the sorbed component outlet and the non-sorbed component outlet are to be shifted in turn downstream as the time lapses. It is also possible to measure the concentration of either the sorbed component or the non-sorbed component and to choose the outlet position of the selected component and to carry out the shifting of other inlets and outlets following shifting of the selected component outlet.

Alternatively, shifting of the outlets and the inlets is carried out according to a predetermined time schedule and the positions of the inlets and outlets are set according to the concentration distribution in the bed obtained by analysis of the fluid. If the positions of the inlets and outlets vary from the correct ones judged from the concentration distribution measured, the time interval for shifting the positions is shortened or prolonged to adopt to the correct positions.

The preferred application of this invention is to separate fructose from high fructose corn syrup or invert sugar. For example, a simulated moving bed as illustrated in FIG. 1 and packed with calcium type strongly acidic cation exchange resin is used, and there is supplied an aqueous solution containing glucose and fructose at a concentration of 20 to 40% and 15 to 35%, by weight, respectively, as a feed stock and water as a desorbent at a temperature of from 40° to 80° C., and fructose and glucose separated are recovered in aqueous form.

EXAMPLE

A column comprising twelve zones each of which was packed with 0.97 l of a Ca++ type strongly acidic cation exchange resin, as illustrated in FIG. 1, was employed. An aqueous solution of isomerization product of glucose having a total saccharide concentration of 60% by weight and a proportion of fructose to glucose of 1:1.44, as the feed stock, and water, as the desorbent, were supplied to the column and circulated therethrough, and an aqueous glucose and an aqueous fructose separated were withdrawn. The concentration of glucose and fructose were continuously measured by means of a refractometer and a polarimeter provided in the path interconnecting the upstream end and downstream end to determine the concentration distributions.

Figure 6:
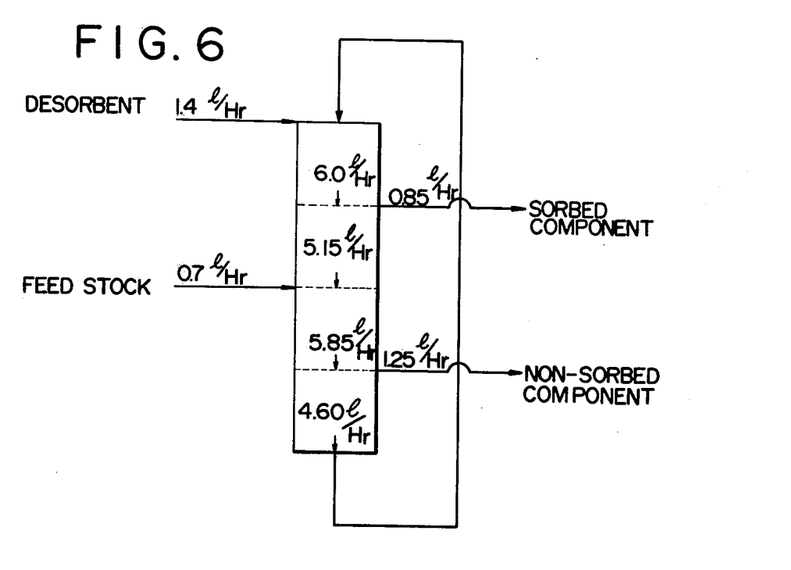
FIGS. 6 and 7 illustrate the flow rate of the feed stock and the desorbent supplied to a simulated moving bed, the flow rates of the sorbed component and the non-sorbed component withdrawn therefrom and the flow rates of the fluid in each zone of the bed according to the Example of this invention.

The flow rates of the supplies, withdrawals and the fluid in each of the zones at this stage are given in FIG. 6. The purity of the glucose and the fructose recovered and the values of $X_S$, $X_N$, $Y_S$ and $Y_N$ calculated on the basis of the concentration distributions measured are given in Table 1.

The shifting of the inlets and the outlet was simultaneously effected at a time interval of 440 seconds.

After continuing the operation for 21 hours, there was observed a lag of the downstream movement of the glucose concentration distribution in a range within which the glucose concentration lowered and, accordingly, the amount each of the aqueous fructose withdrawn and the feed stock supplied was decreased in the same amount to accelerate the downstream movement of the concentration distribution of glucose. Then, there was observed gradual downstream movement of the glucose concentration distribution and a steady state of the concentration distribution was found after 19 hours.

Figure 7:
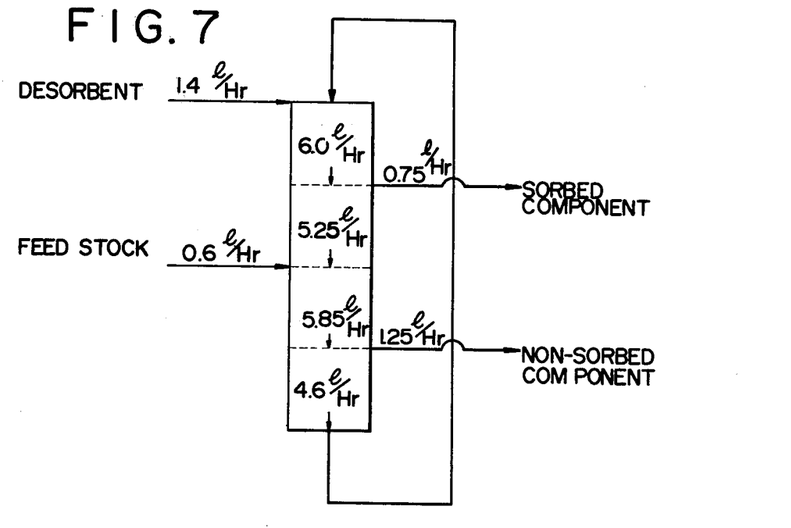

The flow rates of supplies, withdrawals and the fluid in each of the zones at this stage are given in FIG. 7.

The purity each of the glucose and the fructose recovered and the value each of $X_S$, $X_N$, $Y_S$ and $Y_N$ calculated on the basis of the concentration distributions are given in Table 2.

Table 1

| | |
|---|---|
| Purity of glucose | 98.3 wt% |
| Purity of fructose | 87.5 wt% |
| $X_S$ | 0.46 T |
| $X_N$ | 0.23 T |
| $Y_S$ | 0.08 T |
| $Y_N$ | 0.27 T |

Table 2

| | |
|---|---|
| Purity of glucose | 98.5 wt% |
| Purity of fructose | 96.3 wt% |
| $X_S$ | 0.59 T |
| $X_N$ | 0.57 T |
| $Y_S$ | 0.19 T |
| $Y_N$ | 0.20 T |

What is claimed is:

1. In the operation of a simulated moving bed comprising flowing a fluid containing a sorbed component and a non-sorbed component in one direction along a bed packed with a solid sorbent and having the upstream end and the downstream end interconnected to form a circulation loop, introducing a feed stock and a desorbent to the circulating fluid and withdrawing the sorbed component and the non-sorbed component therefrom at selected positions of the bed and shifting downstream the positions of the feed stock inlet, the non-sorbed component outlet, the desorbent inlet and the sorbed component outlet at a predetermined time interval, the improvement in which the concentration of at least one component in the fluid flowing through the bed is measured as at least one point in the path of fluid to predict a concentration distribution of the selected component and the flow rate of the fluid is controlled to maintain the predicted concentration distribution in the desired wave pattern of concentration distribution.

2. In the operation of a simulated moving bed according to claim 1, the improvement in which said desired wave pattern has a range within which at least one value of $C_S/(C_S)$max and $C_N/(C_N)$max is less than 0.1 and which is continuously detected for a period of from 0.25 T to 0.6T in one cycle, wherein $C_S$ and $C_N$ each represents the concentration of the sorbed component and the non-sorbed component, $(C_S)$max and $(C_N)$max each represents the maximum concentration of the sorbed component and the non-sorbed component in one cycle and T represents the duration of one cycle.

3. In the operation of a simulated moving bed according to claim 1, the improvement in which said desired wave pattern has ranges within which each of the values of $C_S/(C_S)$max and $C_N/(C_N)$max is less than 0.1 and which are continuously detected for a period of time of from 0.25 T to 0.6 T in one cycle, wherein $C_S$ and $C_N$ each represents the concentration of the sorbed component and the non-sorbed component, $(C_S)$max and $(C_N)$max each represents the maximum concentration of the sorbed component and the non-sorbed component in one cycle and T represents the duration of one cycle.

4. In the operation of a simulated moving bed according to claim 1, the improvement in which said measurement of the concentration is effected with respect to the sorbed component and the non-sorbed component and said desired wave pattern satisfies the following conditions:

(a) a range within which the value of $C_S/(C_S)$max is less than 0.1 and a range within which the value of $C_N/(C_N)$max is less than 0.1 are continuously detected for a period of 0.25 T to 0.6 T in one cycle, respectively, (b) a range within which the concentration distribution difference of $R \geq 10$ is continuously detected for a period of from 0.1 T to 0.6 T in one cycle, during the concentration of the sorbed component changes from downward to upward, and (c) a range within which the concentration distribution of $R \leq 0.1$ is continuously detected for a period of from 0.1 T to 0.6 T in one cycle, during the concentration of the non-sorbed component changes from downward to upward, wherein $C_S$ represents the concentration of the sorbed component measured, $C_N$ represents the concentration of the non-sorbed component measured and R represents the value of $C_N/C_S$.

5. In the operation of a simulated moving bed according to claim 1, wherein said feed stock is an aqueous solution containing 15 to 35% by weight of glucose and 20 to 40% by weight of fructose, said desorbent is water, said sorbed component is fructose, said non-sorbed component is glucose and said solid sorbent is $Ca^{++}$ type strongly acidic cation exchange resin.

6. In the operation of a simulated moving bed comprising flowing a fluid containing a sorbed component and a non-sorbed component in one direction along a bed packed with a solid sorbent and having the upstream end and the downstream end interconnected to form a circulation loop, introducing a feed stock and a desorbent to the circulating fluid and withdrawing the sorbed component and the non-sorbed component therefrom at selected positions of the bed and shifting downstream the positions of the feed stock inlet, the non-sorbed component outlet, the desorbent inlet and the sorbed component outlet at a predetermined time interval, the improvement in which the concentration of at least one component in the fluid flowing through the bed is measured at at least one point in the path of fluid to predict a concentration distribution of the selected component and the flow rate of the fluid is controlled to maintain the predicted concentration distribution in the desired wave pattern of concentration distribution, and the positions of the feed stock inlet, the non-sorbed component outlet, the desorbent inlet and the sorbed component outlet and the time interval of shifting are determined on the basis of the predicted concentration distribution.

7. In the operation of a simulated moving bed according to claim 6, the improvement in which said desired wave pattern has a range within which at least one value of $C_S/(C_S)$max and $C_N/(C_N)$max is less than 0.1 and which is continuously detected for a period of from 0.25 T to 0.6 T in one cycle, wherein $C_S$ and $C_N$ each represents the concentration of the sorbed component and the non-sorbed component, $(C_S)$max and $(C_N)$max each represents the maximum concentration of the sorbed component and the non-sorbed component in one cycle and T represents the duration of one cycle.

8. In the operation of a simulated moving bed according to claim 6, the improvement in which said desired wave pattern has ranges within which each of the values of $C_S/(C_S)$max and $C_N/(C_N)$max is less than 0.1 and which are continuously detected for a period of from 0.25 T to 0.6 T in one cycle, wherein $C_S$ and $C_N$ each represents the concentration of the sorbed component and the non-sorbed component, $(C_S)$max and $(C_N)$max each represents the maximum concentration of the sorbed component and the non-sorbed component in one cycle and T represents the duration of one cycle.

9. In the operation of a simulated moving bed according to claim 6, the improvement in which said measurement of the concentration is effected with respect to the sorbed component and the non-sorbed component and said desired wave pattern satisfies the following conditions:

(a) a range within which the value of $C_S/(C_S)$max is less than 0.1 and a range within which the value of $C_N/(C_N)$max is less than 0.1 are continuously detected for a period of 0.25 T to 0.6 T in one cycle, respectively, (b) a range within which the concentration distribution of $R \geq 10$ is continuously detected for a period of from 0.1 T to 0.6 T in one cycle, during the concentration of the sorbed component changes from downward to upward, and (c) a range within which the concentration distribution of $R \leq 0.1$ is continuously detected for a period of from 0.1 T to 0.6 T in one cycle, during the concentration of the non-sorbed component changes from downward to upward, wherein $C_S$ represents the concentration of the sorbed component measured, $C_N$ represents the concentration of the non-sorbed component measured and R represents the value of $C_N/C_S$.

10. In the operation of a simulated moving bed according to claim 6, wherein said feed stock is an aqueous solution containing 15 to 35% by weight of glucose and 20 to 40% by weight of fructose, said desorbent is water, said sorbed component is fructose, said non-sorbed component is glucose and said solid sorbent is $Ca^{++}$ type strongly acidic cation exchange resin.

* * * * *